Oct. 23, 1923.
T. F. PERKINS
TOLLER
Filed March 29, 1920 2 Sheets-Sheet 1
1,471,349
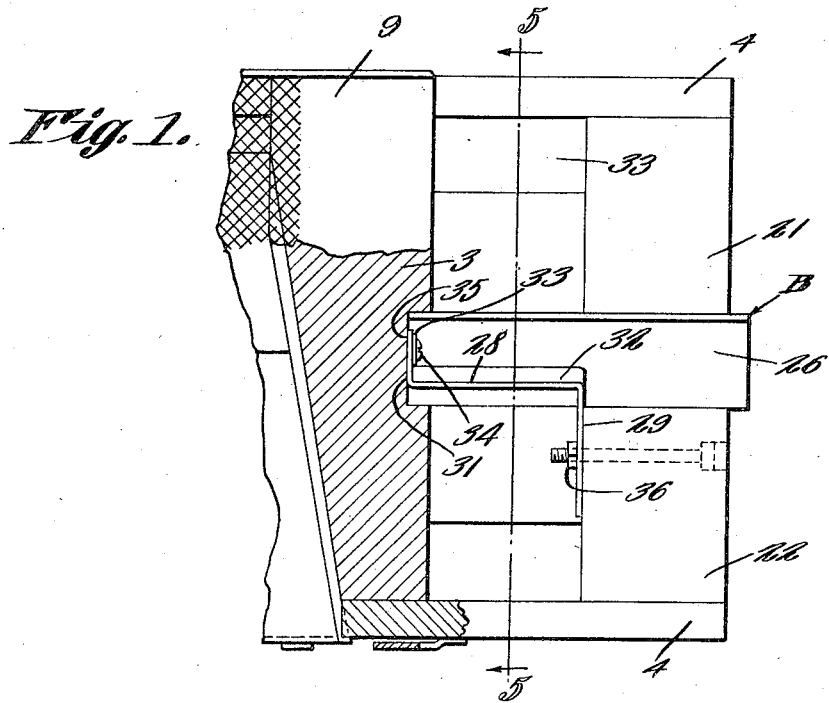
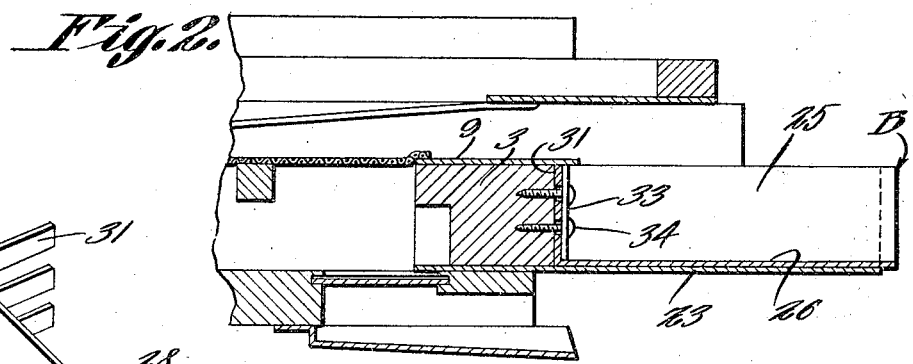
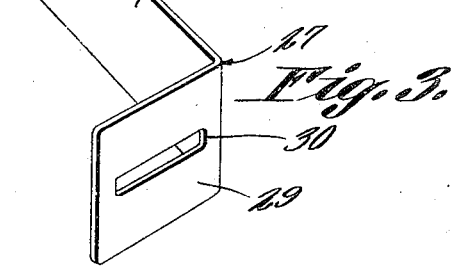
T. F. Perkins, Inventor.
By C. A. Snow & Co.
Attorneys Oct. 23, 1923.

T. F. PERKINS

TOLLER 1,471,349

Filed March 29, 1920 — 2 Sheets-Sheet 2

T.F.Perkins, Inventor.

By C.A.Snow & Co.
Attorneys

Patented Oct. 23, 1923.

1,471,349

UNITED STATES PATENT OFFICE.

THOMAS F. PERKINS, OF ATLANTA, TEXAS.

TOLLER.

Application filed March 29, 1920. Serial No. 369,621.

*To all whom it may concern:*

Be it known that I, THOMAS F. PERKINS, a citizen of the United States, residing at Atlanta, in the county of Cass and State of Texas, have invented a new and useful Toller, of which the following is a specification.

It is the object of this invention to provide novel means whereby a miller's toll may be taken automatically from the grist.

Figure 4:
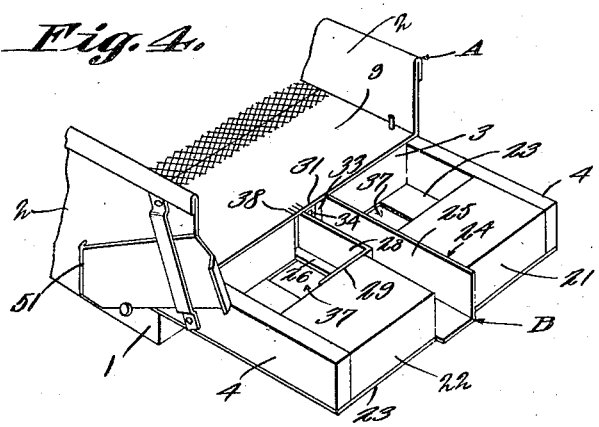
Figure 5:
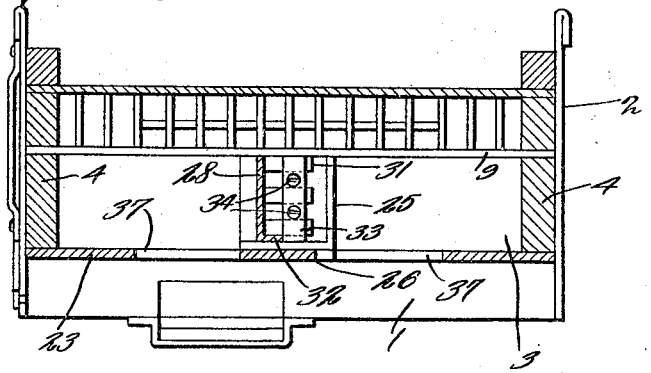
Figure 6:
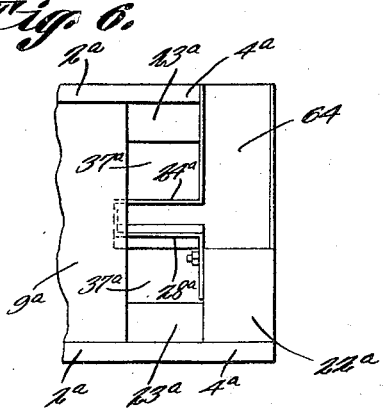

Figure 1 shows in top plan, a portion of a main screen whereunto the toll chute forming the subject matter of this application has been applied; Figure 2 is a longitudinal section of the structure shown in Figure 1; Figure 3 is a perspective view showing one of the members which make up the toll chute; Figure 4 is a perspective view showing the toll chute in place on the main chute or screen; Figure 5 is a section on the line 5—5 of Figure 1; Figure 6 is a fragmental top plan showing a modification.

In carrying out the invention as disclosed in Figures 1, 2, 3, 4, 5 and 6, there is provided a main chute which is denoted generally by the letter A. The chute A includes a base 1 on which side strips 2 are superposed and secured. The side strips 2 are connected, adjacent to their forward ends, by a transverse end piece 3. The side strips 2 project beyond the end piece 3 to form extensions 4. A lip 9, in the form of a plate, is mounted on the end piece 3, as shown to best advantage in Figure 4.

A closure is located between the forward ends of the extensions 4 of the side strips 2, this closure being in the form of blocks 21 and 22 having their inner ends spaced apart. A bottom plate 23 extends rearwardly from the blocks 21 and 22 and is engaged at its rear end between the end piece 3 and the forward portion of the bottom 1, as shown in Figure 2. The letter B marks a toll chute including a member 24 which is L-shaped in cross section (see Figure 4), the member 24 including a side 25 and a bottom 26. The member 24 extends rearwardly from the block 21 to the end piece 3 and is located between the blocks 21 and 22. The toll chute B includes, further, a Z-shaped member 27, shown in Figure 3 of the drawings. The member 27 comprises a side 28 equipped at its lower edge with an inwardly extended foot 32 (Fig. 1), there being a front flange 29 at the forward end of the side 28, the flange 29 having an elongated slot 30. The rear end of the side 28 of the member 27 is provided with a rear flange made up of fingers 31. The fingers 31 project in an opposite direction from that in which the front flange 29 extends. The foot 32 of the member 27 rests on the bottom 26 of the member 24, the front flange 29 cooperating with the rear surface of the block 22 and the fingers 31 bearing against the forward edge of the end piece 3. One side of the toll chute B is defined by the part 25, the other side of the toll chute being defined by one end of the block 22 and the part 28. A clip 33 extends transversely of the fingers 31 of the member 27 and is attached by securing elements 34 to the forward end of the member 3. The member 3 has a recess 35 (Fig. 1) wherein the rear end of the toll chute B is received. A clamping device 36, preferably a bolt, extends through the block 22 and through the slot 30 in the flange 29 of the member 27. On each side of the toll chute B, openings 37 are formed in the bottom plate 23. Gauge marks 38 are inscribed on the upper surface of the lip 9 adjacent to the forward edge thereof, as shown in Figure 4. It will be obvious that by loosening the clamp bolt 36 and by loosening the securing elements 34, the member 27 may be slid transversely toward and away from the side 25 of the member 24, thereby to decrease or increase the width of the toll chute and, consequently, to vary the amount of toll taken, it being remarked, incidentally, at this point, that the grain, having been screened, runs off the lip 9 and passes, to the rear of the closure blocks 21 and 22, downwardly through the openings 37 in the bottom plate 23.

In practical operation, the grain moves forwardly over the lip 9, and passes downwardly through the openings 37. A portion of the grain is received by the toll chute B. It has been pointed out hereinbefore that, through the instrumentality of the securing elements 34 and the clamp bolt 36, the toll chute 7 may be widened or contracted at will, thereby to increase or decrease the amount of toll taken, the gauge marks 38 aiding in setting the guide 28 of the toll chute with respect to the side 25 thereof.

In Figure 1 of the drawings, the toll chute B discharges in the direction in which the main chute A is reciprocated. It may be desirable to have the toll chute discharge laterally, and then recourse is had to the modification shown in Figure 6. In Figure 6 parts hereinbefore described are designated by numerals previously used, with the suffix "a." The member 24ª of the toll chute is supplied with a lateral, trough-shaped extension 64, closed at one end by the block 22ª, the block 21 of Figures 3 and 4 being omitted, the extension 64 abutting against one of the parts 4ª. The element 28ª of the toll chute remains unchanged and is of the form depicted in Figures 3 and 4, the adjustment in the width of the toll chute being brought about as hereinbefore explained.

Having thus described the invention, what is claimed is:

1. In a device of the class described, a main chute comprising side strips and an end piece located therebetween; a closure projecting inwardly from one side strip; a toll chute comprising an L-shaped member extended from the closure to the end piece and including a bottom and a side; a plate cooperating with the closure to form the other side of the chute, the plate including projecting parts cooperating respectively with the rear surface of the closure and with the forward surface of the end piece; and means for securing said parts of the plate to the closure and to the end piece adjustably, to permit the distance between the plate and said side of the chute to be adjusted.

2. In a device of the class described, a main chute comprising side strips and an end piece located therebetween; a closure projecting inwardly from one side strip; a toll chute comprising an L-shaped member extended from the closure to the end piece and including a bottom and a side; a plate cooperating with the closure to form the other side of the chute and including oppositely projecting parts cooperating respectively with the rear surface of the closure and with the forward surface of the end piece, the plate being provided at its lower edge with a projecting flange resting on the bottom of said L-shaped member; and means for securing said parts of the plate to the closure and to the end piece adjustably, to permit the distance between the plate and said side of the chute to be adjusted.

3. A device of the class described, constructed as set forth in claim 1, and further characterized by the fact that the L-shaped member of the toll chute embodies a laterally projecting discharge element, closed at its inner end by the closure member.

In testimony that I claim the foregoing as my own, I have hereto affixed my signature in the presence of two witnesses.

THOMAS F. PERKINS.

Witnesses:
 MASON B. LAWTON,
 IVY E. SIMPSON.